United States Patent [19]
Mochizuki et al.

[11] Patent Number: 4,962,505
[45] Date of Patent: Oct. 9, 1990

[54] SOLID-STATE LASER DEVICE HAVING A HIGH CONVERSION EFFICIENCY BETWEEN ELECTRIC POWER AND OUTPUT POWER AND A LAMP DEVICE THEREFOR

[75] Inventors: Takayasu Mochizuki; Josef R. Unternahrer, both of Tokyo; Mitsuhisa Moriyama, Kanagawa, all of Japan

[73] Assignees: Hoya Corporation; Research Development Corporation, both of Tokyo, Japan

[21] Appl. No.: 303,922

[22] Filed: Jan. 30, 1989

[30] Foreign Application Priority Data

Jan. 30, 1988 [JP] Japan ................................. 63-20809
Sep. 30, 1988 [JP] Japan ................................. 63-248520

[51] Int. Cl.⁵ ........................................... H01S 3/093
[52] U.S. Cl. ............................................ 372/72; 372/70; 372/79
[58] Field of Search ..................... 372/33, 66, 69, 70, 372/72, 99

[56] References Cited

U.S. PATENT DOCUMENTS

| | | | |
|---|---|---|---|
| 3,179,898 | 4/1965 | Meltzer | 372/72 |
| 3,238,470 | 3/1966 | Mooney | 372/72 |
| 3,634,777 | 1/1972 | Uchida | 372/72 |
| 4,483,007 | 11/1984 | Winston | 372/72 |
| 4,506,369 | 3/1985 | Houston | 372/72 |
| 4,641,315 | 2/1987 | Draggoo | 372/72 |
| 4,682,338 | 7/1987 | Kuppenheimer, Jr. | 372/72 |
| 4,757,513 | 7/1988 | Fukae | 372/99 |

Primary Examiner—William L. Sikes
Assistant Examiner—B. R. R. Holloway
Attorney, Agent, or Firm—Ladas & Parry

[57] ABSTRACT

In a solid-state laser device having a laser medium, a reflector member has first and second curved portions surrounding first and second reflector axes, respectively, and an extension portion extended from the first and the second curved portions towards a principal surface of the laser medium for defining an internal space together with the curved portions. Within the internal space, first and second lamps are disposed farther from the principal surface than the first and the second reflector axes, respectively, with first and second lamp axes of the first and the second lamps juxtaposed to the reflector axes and an optical axis of the laser medium. Each curved portion has an arcuate internal surface which forms a partially circular cylinder having a center axis as the reflector axis. Alternatively, the arcuate internal surface of each curved portion forms a partially elliptic cylinder having a symmetry axis as the reflector axis and an outside focal line with which the lamp axis substantially coincides. The extension portion may have a pair of arcuate internal surfaces extended from the arcuate internal surfaces of the first and the second curved portions, respectively. The extension portion may have a pair of parallel internal surfaces.

20 Claims, 10 Drawing Sheets

SOLID-STATE LASER DEVICE HAVING A HIGH CONVERSION EFFICIENCY BETWEEN ELECTRIC POWER AND OUTPUT POWER AND A LAMP DEVICE THEREFOR

BACKGROUND OF THE INVENTION

This invention relates to a solid-state laser device which comprises a laser medium of, for example, a slab shape and a lamp device for exciting the slab shaped medium. This invention also relates to the lamp device for use in the solid-state laser device.

A solid-state laser device of the type described, comprises a slab shaped medium having an optical axis and a pair of principal surfaces parallel to each other and to the optical axis and a lamp device. The lamp device comprises a reflector member and excitation lamps extended along the optical axis within the reflector member for optically exciting or energizing the slab shaped medium. The slab shaped medium is excited when the principal surfaces are applied with excitation light radiated from the excitation lamps. The solid-state laser device produces an output laser beam having output power when the excitation lamps are supplied with electric power.

It is required to realize a solid-state laser device having a high conversion efficiency between the electric or input power and the output power In order to achieve a high conversion efficiency, it is desirable to dispose the excitation lamps in the vicinity of the principal surfaces. However, it is impossible to dispose the excitation lamps near to the principal surfaces on realization of either a multipath type laser device or a moving slab type laser device for the reason which will be described hereunder.

Figure 4:
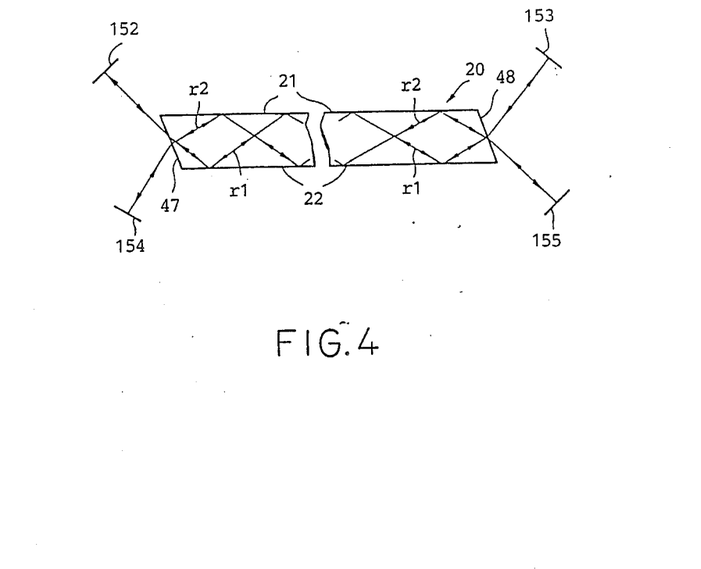
FIG. 4 is a side view of a combination of a slab shaped medium and resonator mirrors in a multipath type laser device to which this invention is applicable.

In a multipath type laser device which will later be described in conjunction with a figure of the accompanying drawing, a plurality of zigzag resonance optical paths are formed in the slab shaped medium along the optical axis when the slab shaped medium is excited by the excitation lamps. Resonator mirrors corresponding to the resonance optical paths and holding mechanisms for the resonator mirrors are obstacles to dispose the excitation lamps in the vicinity of the principal surfaces. It is therefore impossible to dispose the excitation lamps near to the principal surfaces.

Description will proceed to the moving slab type laser device. In the moving slab type laser device, a slab shaped medium has an elongated width. That is, each principal surface has a wide width. Reciprocating motion of the slab shaped medium is carried out by a moving mechanism along a direction which is perpendicular to the optical axis and which is parallel to the principal surfaces. Inasmuch as the moving mechanism is an obstacle to dispose the excitation lamps in the vicinity of the principal surfaces, it is also impossible to dispose the excitation lamps near to the principal surfaces. Such a moving slab type laser device is disclosed, for example, in U.S. Pat. No. 4,555,786 by Robert L. Byer.

A conventional solid-state laser device is disclosed in U.S. Pat. No. 4,506,369 by J. M. Houston and comprises first and second excitation lamps extended along the optical axis within a reflector member and disposed in the vicinity of first and second side surfaces, respectively, which are parallel to the optical axis and which are perpendicular to the principal surfaces.

Since the excitation lamps are disposed near to the side surfaces, respectively, the Houston's device may be applicable to the multipath type laser device. However, even if the Houston's device is applied to the multipath type laser device, the Houston's device is defective in that there is a limit to elevate the conversion efficiency for the reason which will later be described hereunder. Inasmuch as the excitation lamps are disposed near to the side surfaces, respectively, the principal surfaces are not almost applied directly with the excitation light of the excitation lamps but are applied with reflected or indirect light reflected by the reflector member. As the principal surfaces are substantially applied with only the indirect light, there is a limit to elevate the conversion efficiency.

In addition, the Houston's device can not be applied to the moving slab type laser device. This is because the moving mechanism is also an obstacle to dispose the excitation lamps near to the side surfaces of the slab shaped medium.

Another conventional solid-state laser device is disclosed in U.S. Pat. No. 4,644,555 by Satoru Amano and comprises a reflector member having first and second reflector axes parallel to the optical axis and first and second arcuate internal surfaces, respectively, which are contiguous to each other and which surround the reflector axes, respectively. The reflector member further has a pair of parallel internal wall surfaces which are extended in parallel to each other from the first and the second arcuate internal surfaces towards a principal surface of the slab shaped medium.

The first and the second arcuate internal surfaces form first and second partially elliptic cylinders. The first and the second partially elliptic cylinders have first and second symmetry axes as the first and the second reflector axes, first and second inside focal lines, and first and second outside focal lines, respectively, which are farther from the principal surface than the first and the second inside focal lines, respectively.

First and second rod shaped laser media are placed on the first and the second outside focal lines, respectively, while first and second excitation lamps are positioned on the first and the second inside focal lines, respectively. Each excitation lamp not only illuminates the principal surface of the slab shaped medium in common to produce an output laser beam but also illuminates a corresponding rod shaped laser medium to produce another output laser beam.

Supposing that extension of the parallel internal wall surfaces is made along a direction perpendicular to the optical axis, each excitation lamp may be positioned far from the principal surface so as to realize the multipath type laser device. However, the Amano's device is also defective in that there is a limit to elevate the conversion efficiency for the reason which will be described hereunder.

Attention will be directed to the first excitation lamp. Inasmuch as the first excitation lamp is positioned on the first inside focal line, the first arcuate internal surface reflects the excitation light of the first excitation lamp as reflected or indirect light towards the first rod shaped laser medium located on the first outside focal line. Since the reflected or indirect light is absorbed by the first rod shaped laser medium, the principal surface is not almost applied with the reflected or indirect light reflected by the reflector member. Thus, the principal surface is substantially applied with only direct light of the excitation lamps. This is the reason why the Amano's device has a limit to elevate the conversion efficiency.

SUMMARY OF THE INVENTION

It is therefore an object of the present invention to provide a solid-state laser device which has a high conversion efficiency with excitation lamps disposed far from a principal surface of a slab shaped medium.

It is another object of this invention to provide a solid-state laser device of the type described, which has a low cost.

It is still another object of this invention to provide a solid-state laser device of the type described, which is suitable for realization of a multipath type laser device.

It is yet another object of this invention to provide a solid-state laser device of the type described, which is suitable for realization of a moving slab type laser device.

It is a further object of this invention to provide a lamp device which is suitable for realization of a solid-state laser device having a high conversion efficiency with excitation lamps disposed far from a principal surface of a slab shaped medium.

It is a still further object of this invention to provide a lamp device of the type described, which has a low cost.

It is a yet further object of this invention to provide a lamp device of the type described, which is suitable for realization of a multipath type laser device.

It is a specific object of this invention to provide a lamp device of the type described, which is suitable for realization of a moving slab type laser device.

A solid-state laser device to which this invention is applicable comprises a slab shaped medium having an optical axis and a principal surface parallel to the optical axis, a reflector member having an internal wall surface for defining an internal space, and first and second excitation lamps extended along the optical axis within the internal space. According to this invention, the reflector member comprises: first and second curved portions having first and second reflector axes parallel to the optical axis and first and second arcuate internal surfaces, respectively, which are contiguous to each other and which surround the first and the second reflector axes, respectively; and an extension portion extended from the first and the second curved portions towards the principal surface for defining the internal space together with the first and the second curved portions The first and the second excitation lamps have first and second lamp axes which are farther from the principal surface than the first and the second reflector axes, respectively, and which are juxtaposed to the first and the second reflector axes and the optical axis.

This invention is applicable also to a lamp device for use in a solid-state laser device comprising a laser medium having an optical axis and a principal surface parallel to the optical axis. The lamp device is for exciting the laser medium. The lamp device comprises a reflector member having an internal wall surface for defining an internal space and first and second excitation lamps extended along the optical axis within the internal space. According to this invention, the reflector member comprises: first and second curved portions having first and second reflector axes parallel to the optical axis and first and second arcuate internal surfaces, respectively, which are contiguous to each other and which surround the first and the second reflector axes, respectively; and an extension portion extended from the first and the second curved portions towards the principal surface for defining the internal space together with the first and the second curved portions. The first and the second excitation lamps have first and second lamp axes which are farther from the principal surface than the first and the second reflector axes, respectively, and which are juxtaposed to the first and the second reflector axes and to the optical axis.

DESCRIPTION OF THE PREFERRED EMBODIMENTS

Figure 1:
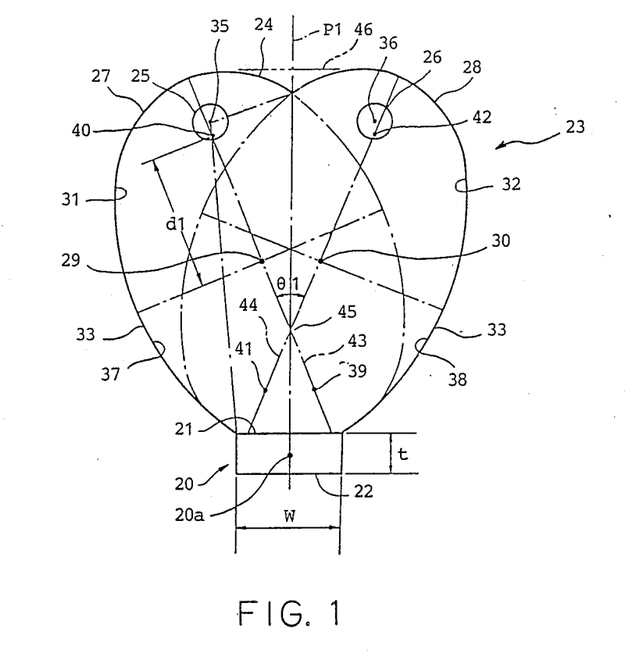
FIG. 1 is a cross sectional view of a solid-state laser device according to a first embodiment of this invention.

Referring to FIG. 1, a solid-state laser device according to a first embodiment of this invention comprises a slab shaped medium 20 having an optical axis 20a perpendicular to the sheet of the figure and first and second principal surfaces 21 and 22 which are parallel to each other and to the optical axis 20a. In the example being illustrated, the slab shaped medium 20 is of crystal material of, for example, GSGG ($Gd_3Sc_2Ga_3O_{12}$) and has a width W of $16\pm0.5$ millimeters and a thickness t of $6\pm0.05$ millimeters.

Figure 2:
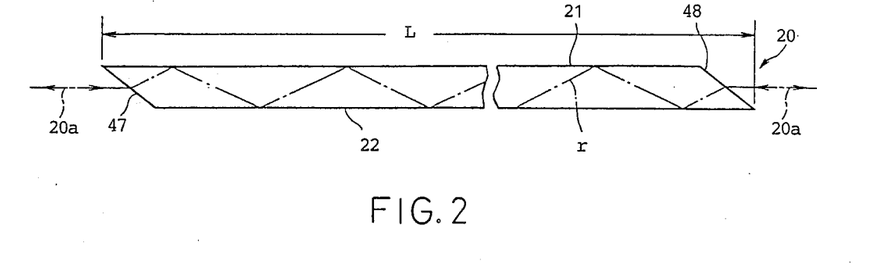
FIG. 2 is a side view of a slab shaped medium for use in the solid-state laser device illustrated in FIG. 1.

Turning to FIG. 2, the slab shaped medium 20 has a length L of $120\pm0.02$ millimeters along the optical axis 20a.

Turning back to FIG. 1, the solid-state laser device further comprises a lamp device 23 for exciting the slab shaped medium 20. The lamp device 23 comprises a reflector member 24 having an internal wall surface for defining an internal space and first and second excitation lamps 25 and 26 extended along the optical axis 20a within the internal space for optically exciting the slab shaped medium 20.

The reflector member 24 comprises first and second curved portions 27 and 28 which have reflector axes 29 and 30 parallel to the optical axis 20a and first and second arcuate internal surfaces 31 and 32, respectively. The first and the second arcuate internal surfaces 31 and 32 are contiguous to each other and partly surround the first and the second reflector axes 29 and 30, respectively.

The reflector member 24 further comprises an extension portion 33 which is extended from the first and the second curved portions 27 and 28 towards the first principal surface 21. The extension portion 33 defines the internal space together with the first and the second curved portions 27 and 28.

The first and the second excitation lamps 25 and 26 have first and second lamp axes 35 and 36. The first and the second lamp axes 35 and 36 are farther from the first principal surface 21 than the first and the second reflector axes 29 and 30, respectively, and are juxtaposed to the first and the second reflector axes 29 and 30 and the optical axis 20a.

More specifically, the extension portion 31 has third and fourth arcuate internal surfaces 37 and 38 contiguous to and extended from the first and the second arcuate internal surfaces 31 and 32 towards the first principal surface 21, respectively. The third and the fourth arcuate internal surfaces 37 and 38 defines the internal space together with the first and the second arcuate internal surfaces 31 and 32.

The first and the third arcuate internal surfaces 31 and 37 form a first partially elliptic cylinder while the second and the fourth arcuate internal surfaces 32 and 38 form a second partially elliptic cylinder. The first partially elliptic cylinder has a first symmetry axis as the first reflector axis 29, a first inside focal line 39 of focal points, and a first outside focal line 40 of focal points. Likewise, the second partially elliptic cylinder has a second symmetry axis as the second reflector axis 30, a second inside focal line 41, and a second outside focal line 42. The first and the second outside focal lines 40 and 42 are farther from the first principal surface 21 than the first and the second inside focal lines 41 and 43, respectively. The first and the second lamp axes 35 and 36 are positioned near to the first and the second outside focal lines 40 and 42, respectively.

The first partially elliptic cylinder has a first hypothetical plane 43 defined by the first inside and the first outside focal lines 39 and 40 while the second partially elliptic cylinder has a second hypothetical plane 44 defined by the second inside and the second outside focal lines 41 and 42. The first and the second hypothetical planes 43 and 44 intersect at a hypothetical line 45 which is nearer to the first principal surface 21 than both the first and the second symmetry axes 29 and 30 and which is farther from the first principal surface 21 than both the first and the second inside focal lines 39 and 41.

In the example being illustrated, each of the first and the second partially elliptic cylinders has a major axis having a length of 30 millimeters and a minor axis of 21 millimeters. An imaginary principal plane P1 defined by the hypothetical line 45 and the optical axis 20a is perpendicular to the first principal surface 21. An angle $\theta 1$ between the major axes of the first and the second partially elliptic cylinders is equal to 44 degrees.

A distance between the imaginary principal plane P1 and each of the first and the second inside focal lines 39 and 41 is equal to 3.5 millimeters. A distance between the first principal surface 21 and each of the first and the second inside focal lines 39 and 41 is equal to 6 millimeters. A distance between the imaginary principal plane P1 and each of the first and the second outside focal lines 40 and 42 is equal to 12.5 millimeters. Therefore, each of the first and the second outside focal lines 40 and 42 is positioned far from the first principal surface 21 by about 45 millimeters. A distance d1 between the first outside focal line 40 and the first symmetry axis 29 is equal to 21.4 millimeters. Another distance between the second outside focal line 42 and the second symmetry axis 30 is equal to the distance d1.

An imaginary plane defined by the first lamp axis 35 and the first outside focal line 40 is parallel to the imaginary principal plane P1. Likewise, another imaginary plane defined by the second lamp axis 36 and the second outside focal line 42 is parallel to the imaginary principal plane P1. The first and the second lamp axes 35 and 36 are positioned farther from the first principal surface 21 than the first and the second outside focal lines 40 and 42, respectively. Distances between the first lamp axis 35 and the first outside focal line 40 and between the second lamp axis 36 and the second outside focal line 42 are equal to 2 millimeters, respectively.

Thus, the lamp device 23 is symmetrical with respect to the imaginary principal plane P1. Each of the first and the second lamps 25 and 26 has the same excitation performance.

The reflector member 24 comprises a reflector body of, for example, aluminum and a reflection film formed on an internal surface of the reflector body. The reflector member 24 has a reflectivity of 90 percent. Between the first and the second arcuate internal surfaces 31 and 32, the reflector member 24 may have a flat internal surface which is indicated by a phantom line 46.

It should be noted here that the solid-state laser device comprises another lamp device (not shown) similar to the lamp device 23. The other lamp device comprises another reflector member and another pair of excitation lamps and is disposed so that an internal wall surface of the other reflector member and the other pair of excitation lamps face the second principal surface 22 of the slab shaped medium 20.

Turning back to FIG. 2 again, operation of the slab shaped medium 20 will be described. When the first and the second principal surfaces 21 and 22 are excited by the lamp devices, a zigzag laser resonance beam r is generated in the slab shaped medium 20 along the optical axis 20a because each of the first and the second principal surfaces 21 and 22 serve as a total reflection surface. The laser resonance beam is outputted from a pair of oblique end surfaces 47 and 48 of the slab shaped medium 20 along the optical axis 20a towards a pair of resonator mirrors (not shown). Each of the oblique end surfaces 47 and 48 serves as not only an exit surface for the resonance beam but also an incident surface for the resonance beam. A part of the resonance beam passes through one of the resonator mirrors as an output laser beam.

Figure 3:
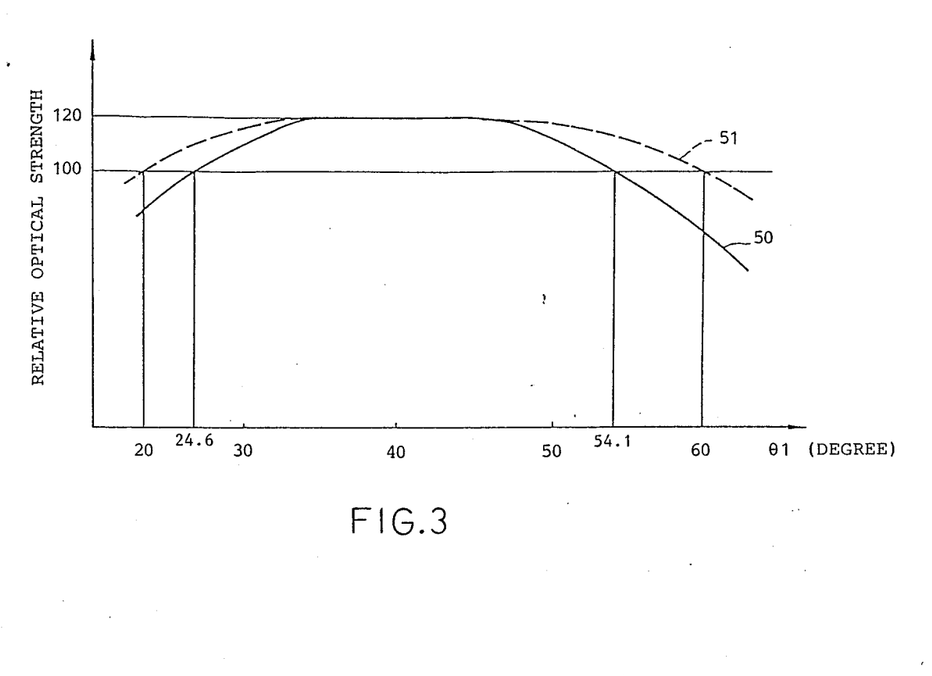
FIG. 3 is a graph for use in describing a merit of the solid-state laser device illustrated in FIG. 1.

Referring to FIG. 3, description will be made as regards a merit of the solid-state laser device illustrated in FIG. 1. A curve 50 of a solid line shows a characteristic of a relative optical strength of excitation light applied to the first principal surface 21 (FIG. 1) when the angle $\theta 1$ is varied in the solid-state laser device illustrated in FIG. 1. The relative optical strength is assumed to be equal to 100 in an ideal case where the principal surface 21 is applied with a whole of excitation light of an experimental lamp without any loss. The experimental lamp has the same excitation performance as either one of the lamps 25 and 26 (FIG. 1) has. Another curve 51 of a broken line shows a characteristic of the relative optical strength in a modified case where the first and the second lamp axes 35 and 36 are perfectly coincident with the first and the second outside focal lines 40 and 42, respectively, in the solid-state laser device illustrated in FIG. 1.

As is apparent from the curves 50 and 51, the solid-state laser device illustrated in FIG. 1 has a relative optical strength greater than 100 when the solid-state laser device has the angle θ1 within an extent between 20 degrees and 60 degrees. In other words, the solid-state laser device has a relative optical strength greater than that of the above-mentioned ideal case where the experimental lamp is used instead of the excitation lamps 25 and 26. A maximum value of the relative optical strength is equal to 120. As a result, the solid-state laser device illustrated in FIG. 1 has a high conversion efficiency between electric or input power and output power of the solid-state laser device with the excitation lamps 25 and 26 disposed far from the first principal surface 21.

In an experiment for making the graph of FIG. 3, further confirmation is made of the facts as follows. In FIG. 1, it is desirable in view of uniformity and the strength of the excitation light that a distance between the imaginary plane P1 and each of the first and the second inside focal lines 39 and 41 is not greater than a quarter of the width W of the slab shaped medium 20. It is also desirable in view of the uniformity and the strength of the excitation light that each of distances between the first lamp axis 35 and the first outside focal line 40 and between the second lamp axis 36 and the second outside focal line 42 is not greater than a quarter of the distance d1 between the first outside focal line 40 and the first symmetry axis 29.

Referring to FIG. 4, description will be made as regards a multipath type laser device to which the solid-state laser device illustrated in FIG. 1 is applicable. In the multipath type laser device, first and second zigzag resonance optical paths r1 and r2 are formed in a slab shaped medium 20 along an optical axis of the slab shaped medium 20 when the first and the second principal surfaces 21 and 22 is excited by excitation lamps as mentioned in the preamble of the instant specification.

A pair of resonator mirrors 152 and 153 are disposed near to oblique end surfaces 47 and 48 of the slab shaped medium 20 in correspondence to the resonance optical path r1. Another pair of resonator mirrors 154 and 155 are also disposed in the vicinity of the oblique end surfaces 47 and 48 in correspondence to the resonance optical path r2. In addition, holding mechanisms (not shown) are disposed near to the oblique end surfaces 47 and 48 for holding the resonator mirrors 152 through 155.

With this structure, the resonator mirrors 152 through 155 and the holding mechanisms are obstacles to dispose the excitation lamps in the vicinity of the first and the second principal surfaces 21 and 22 along the optical axis as also described in the preamble of the instant specification. Inasmuch as the solid-state laser device illustrated in FIG. 1 has a high conversion efficiency with the excitation lamps 25 and 26 positioned far from the first principal surface 21, the solid-state laser device is suitable for realization of the multipath type laser device.

Figure 5:
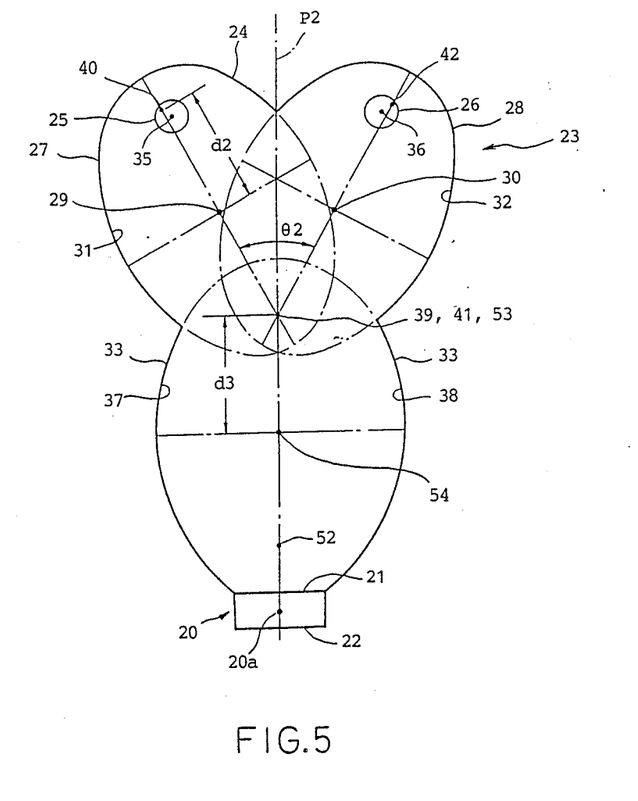
FIG. 5 is a cross sectional view of a solid-state laser device according to a second embodiment of this invention.

Referring to FIG. 5, a solid-state laser device according to a second embodiment of this invention comprises similar parts designated by like reference numerals. Like in the solid-state laser device illustrated in FIG. 1, first and second curved portions 27 and 28 have first and second reflector axes 29 and 30 parallel to an optical axis 20a of a slab shaped medium 20 and first and second arcuate internal surfaces 31 and 32, respectively. An extension portion 33 has third and fourth arcuate internal surfaces 37 and 38 as in the solid-state laser device illustrated in FIG. 1.

In FIG. 5, the first and the second arcuate internal surfaces 31 and 32 form first and second partially elliptic cylinders, respectively, while the third and the fourth arcuate internal surfaces 37 and 38 form a third partially elliptic cylinder. The first partially elliptic cylinder has a first symmetry axis as the first reflector axis 29, a first inside focal line 39, and a first outside focal line 40. The second partially elliptic cylinder has a second symmetry axis as the second reflector axis 30, a second inside focal line 41, and a second outside focal line 42. The first and the second outside focal lines 40 and 42 are farther from a first principal surface 21 of the slab shaped medium 20 than the first and the second inside focal lines 39 and 41, respectively.

The third partially elliptic cylinder has a third inside focal line 52, a third outside focal line 53, and a third symmetry axis 54. The third inside focal line 52 is nearer to the first principal surface 21 than the third outside focal line 53. The first and the second inside focal lines 39 and 41 and the third outside focal line 53 are perfectly coincident with one another. The first and the second lamp axes 35 and 36 are positioned near to the first and the second outside focal lines 40 and 42, respectively.

In the example being illustrated, each of the first and the second partially elliptic cylinders has a major axis having a length of 27.5 millimeters and a minor axis of 18 millimeters while the third partially elliptic cylinder has a major axis having a length of 30 millimeters and a minor axis of 21 millimeters. An imaginary principal plane P2 defined by the first and the second inside focal lines 39 and 41, the outside focal line 53, the third inside focal line 52, and the optical axis 20a is perpendicular to the first principal surface 21. The first and the second outside focal lines 40 and 42 are symmetrical with respect to the imaginary principal plane P2. An angle θ2 between the major axes of the first and the second partially elliptic cylinders is equal to 57.5 degrees.

A distance d2 between the first outside focal line 40 and the first symmetry axis 29 is equal to 20.7 millimeters. Another distance between the second outside focal line 42 and the second symmetry axis 30 is equal to the distance d2. Still another distance d3 between the third outside focal line 53 and the third symmetry axis 54 is equal to 21.4 millimeters. The third outside focal line 53 is far from the first principal surface 21 by 47.5 millimeters.

The first and the second lamp axes 35 and 36 are positioned so as to be nearer to the first principal surface 21 than the first and the second outside focal lines 40 and 42, respectively, and to be nearer to the imaginary principal plane P2 than the first and the second outside focal lines 40 and 42, respectively. A distance between each of the first and the second lamp axes 35 and 36 and an imaginary plane defined by the first and the second outside focal lines 40 and 42 is equal to 1 millimeter. Another distance between the first lamp axis 35 and another imaginary plane which is parallel to the imaginary principal plane P2 and which is defined by the first outside focal line 40 is equal to 2 millimeters. Likewise, still another distance between the second lamp axis 36 and still another imaginary plane which is parallel to the imaginary principal plane P2 and which is defined by the second outside focal line 42 is also equal to 2 millimeters. An interaxial distance between the first and the second lamp axes 35 and 36 is equal to 36.5 millimeters. As a result, each of the first and the second outside focal lines 40 and 42 is positioned far from the first principal surface 21 by about 90 millimeters.

Thus, the lamp device 23 is symmetrical with respect to the imaginary principal plane P2. Each of the first and the second lamps 25 and 26 has the same excitation performance.

Figure 6:
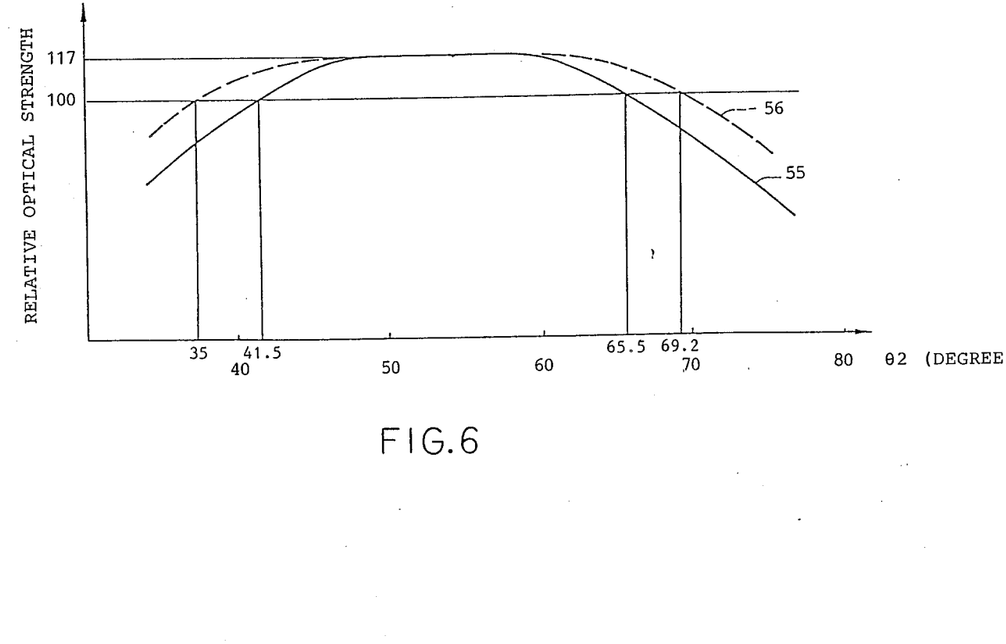
FIG. 6 is a graph for use in describing a merit of the solid-state laser device illustrated in FIG. 5.

Referring to FIG. 6, description will be made as regards a merit of the solid-state laser device illustrated in FIG. 5. A curve 55 of a solid line shows a characteristic of a relative optical strength of excitation light applied to the first principal surface 21 (FIG. 5) when the angle $\theta 2$ is varied in the solid-state laser device illustrated in FIG. 5. As mentioned above, the relative optical strength is assumed to be equal to 100 in an ideal case where the principal surface 21 is applied with a whole of excitation light of an experimental lamp without any loss. The experimental lamp has the same excitation performance as either one of the lamps 25 and 26 (FIG. 5) has. Another curve 56 of a broken line shows a characteristic of the relative optical strength in a modified case where the first and the second lamp axes 35 and 36 are perfectly coincident with the first and the second outside focal lines 40 and 42, respectively, in the solid-state laser device illustrated in FIG. 5.

As is apparent from the curves 55 and 56, the solid-state laser device illustrated in FIG. 5 has a relative optical strength greater than 100 when the solid-state laser device has the angle $\theta 2$ within an extent between 35 degrees and 70 degrees. In other words, the solid-state laser device has a relative optical strength greater than that of the above-mentioned ideal case where the experimental lamp is used instead of the excitation lamps 25 and 26. A maximum value of the relative optical strength is equal to 117. As a result, the solid-state laser device illustrated in FIG. 5 has also a high conversion efficiency with the excitation lamps 25 and 26 disposed far from the first principal surface 21.

In an experiment for making the graph of FIG. 6, further confirmation is made of the facts as follows. In FIG. 5, it is not necessary that the first and the second inside focal lines 39 and 41 are perfectly coincident with the third outside focal point 53. However, it is desirable in view of uniformity and the strength of the excitation light that a distance between the first and the second inside focal lines 39 and 41 is not greater than a quarter of the distance d2 between the first outside focal line 40 and the first symmetry axis 29. It is also desirable in view of the uniformity and the strength of the excitation light that another distance between the third inside focal line 52 and the first principal surface 21 is not greater than a half of the distance d3 between the third outside focal line 53 and the third symmetry axis 54. The third inside focal line 52 may be positioned under the first principal surface 21 of FIG. 5.

Figure 7:
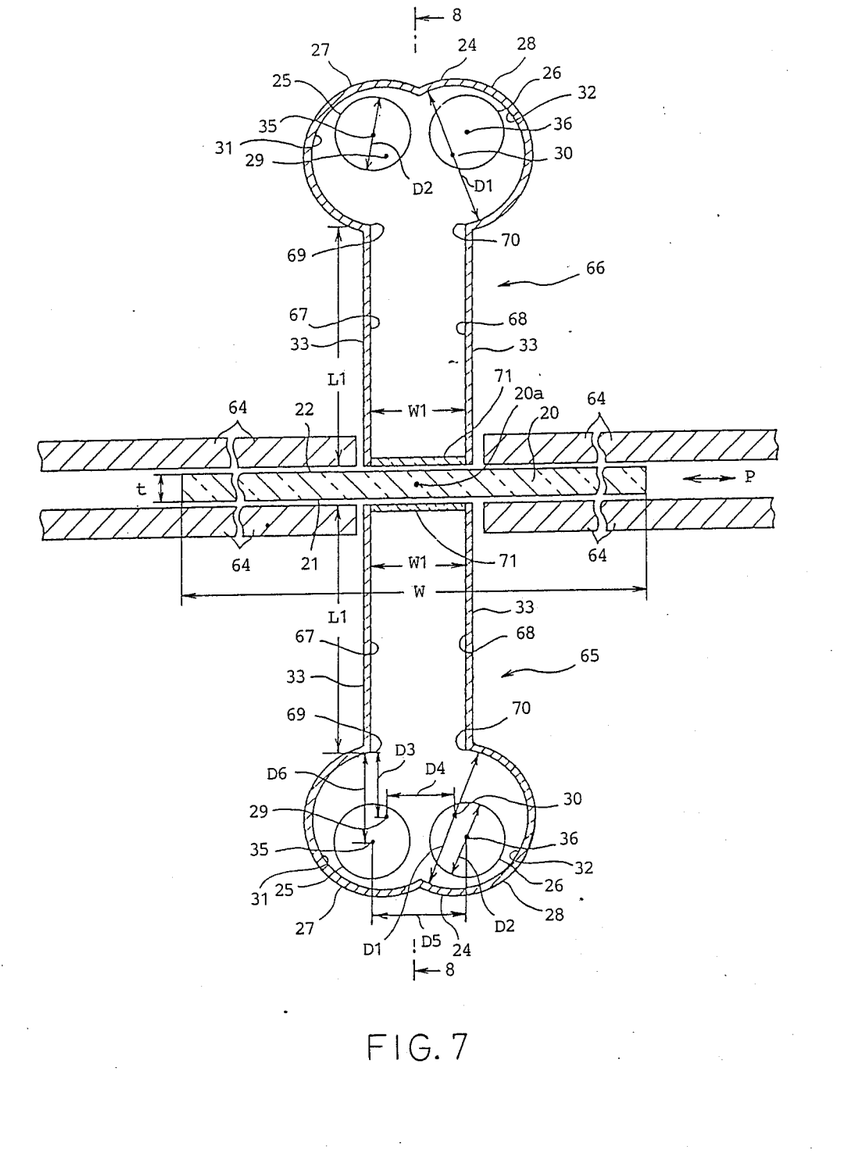
FIG. 7 is a cross sectional view of a solid-state laser device according to a third embodiment of this invention.

Referring to FIG. 7, a solid-state laser device according to a third embodiment of this invention is for use as a moving slab type laser device described in the preamble of the instant specification. The solid-state laser device therefore comprises a slab shaped medium 20 having an elongated width W. In other words, each of first and second principal surfaces 21 and 22 which are parallel to an optical axis 20a and has a wide width W. In the example being illustrated, the slab shaped medium 20 is of, for example, Nd doped laser glass and has a width W of 225±0.5 millimeters and a thickness t of 6±0.05 millimeters.

Figure 8:
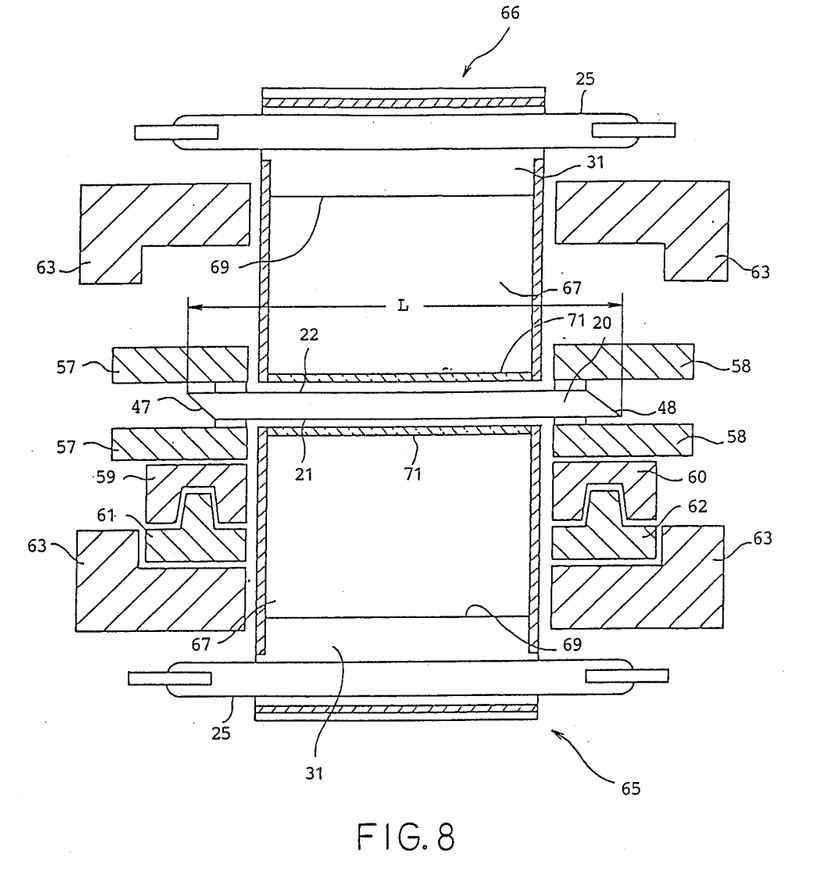
FIG. 8 is an axial sectional view taken along a line 8—8 of FIG. 7.

Turning to FIG. 8, the slab shaped medium 20 has a length L of 225±0.5 millimeters along the optical axis 20a (FIG. 7). The slab shaped medium 20 has first and second end portions held by first and second holding members 57 and 58, respectively. The first and the second holding members 57 and 58 are fixed to first and second movable members 59 and 60, respectively. The first and the second movable members 59 and 60 are movable on first and second rail members 61 and 62, respectively, which are fixed to a device frame 63 of the solid-state laser device. Thus, the slab shaped medium 20 is capable of reciprocating in a direction indicated by an arrow P illustrated in FIG. 7.

Turning back to FIG. 7, the slab shaped medium is cooled by helium gas introduced between each of the first and the second principal surfaces 21 and 22 and each of cooling plates 64 made of, for example, aluminum. The solid-state laser device further comprises first and second lamp devices 65 and 66 which face the first and the second principal surfaces 21 and 22, respectively. In this event, each of the first and the second lamp devices 65 and 66 is placed with a predetermined distance spaced between each of the first and the second lamp devices 65 and 66 and each of the first and the second principal surfaces 21 and 22. Inasmuch as the first and the second lamp devices 65 and 66 are similar in structure to each other, description will hereinafter be made only as regards the first lamp device 65.

Like the lamp device 23 of the solid-state laser device illustrated in FIG. 1, the first lamp device 65 comprises a reflector member 24 comprising first and second curved portions 27 and 28 and an extension portion 33 extended from the first and the second curved portions 27 and 28 towards the first principal surface 21. The first and the second curved portions 27 and 28 have first and second reflector axes 29 and 30 parallel to the optical axis 20a and first and second arcuate internal surfaces 31 and 32, respectively.

The first and the second arcuate internal surfaces 31 and 32 form first and second partially circular cylinders having first and second center axes as the first and the second reflector axes 29 and 30, respectively. First and second excitation lamps 25 and 26 have first and second lamp axes 35 and 36 which are farther from the first principal surface 21 than the first and the second center axes 29 and 30, respectively. Each of the first and the second excitation lamps 25 and 26 is of, for example, a xenon flash lamp.

The extension portion 33 comprises a pair of parallel internal wall surfaces 67 and 68 which are contiguous to the first and the second arcuate internal surfaces 31 and 32, respectively. The parallel internal wall surfaces 67 and 68 are extended in parallel to each other from the first and the second arcuate internal surfaces 31 and 32 towards the first principal surface 21, respectively. A reference numeral 69 designates a first boundary between the first arcuate internal surface 31 and the internal wall surface 67 while another reference numeral 70 designates a second boundary between the second arcuate internal surface 32 and the internal wall surface 68. A transparent plate 71 of, for example, Pyrex glass is fixed between terminated ends of the parallel internal wall surfaces 67 and 68 with the predetermined distance spaced between the transparent plate 71 and the first principal surface 21.

In the example being illustrated, the first excitation lamp device 65 is symmetrical with respect to an imaginary center principal plane which is defined by a center line 8—8 of FIG. 7 and which is extended in a direction parallel to the optical axis 20a. Each of the parallel internal wall surfaces 67 and 68 has a length L1 of 50 millimeters. A distance W1 between the parallel internal wall surfaces 67 and 68 is 20 millimeters. Each of the first and second partially circular cylinders has a diameter D1 of 30 millimeters. Each of the first and the second excitation lamps 25 and 26 has a diameter D2 of 16 millimeters. Supposing that a first imaginary plane is defined by the first and the second boundaries 69 and 70 and that a second imaginary plane is defined by the first and the second reflector or center axes 29 and 30, a distance D3 between the first and the second imaginary planes is 14.7 millimeters. An interaxial distance D4 between the first and the second center axes 29 and 30 is 14 millimeters. Another interaxial distance D5 between the first and the second lamp axes 35 and 36 is 20 millimeters. Supposing that a third imaginary plane is defined by the first and the second lamp axes 35 and 36, a distance D6 between the third imaginary plane and the first imaginary plane defined by the first and the second boundaries 69 and 70 is also 20 millimeters.

The reflector member 24 comprises a reflector body of, for example, aluminum and a coating layer of, for example, gold which is coated on an internal surface of the reflector body. The coating layer has a reflectivity of about 90 percent.

Figure 9:
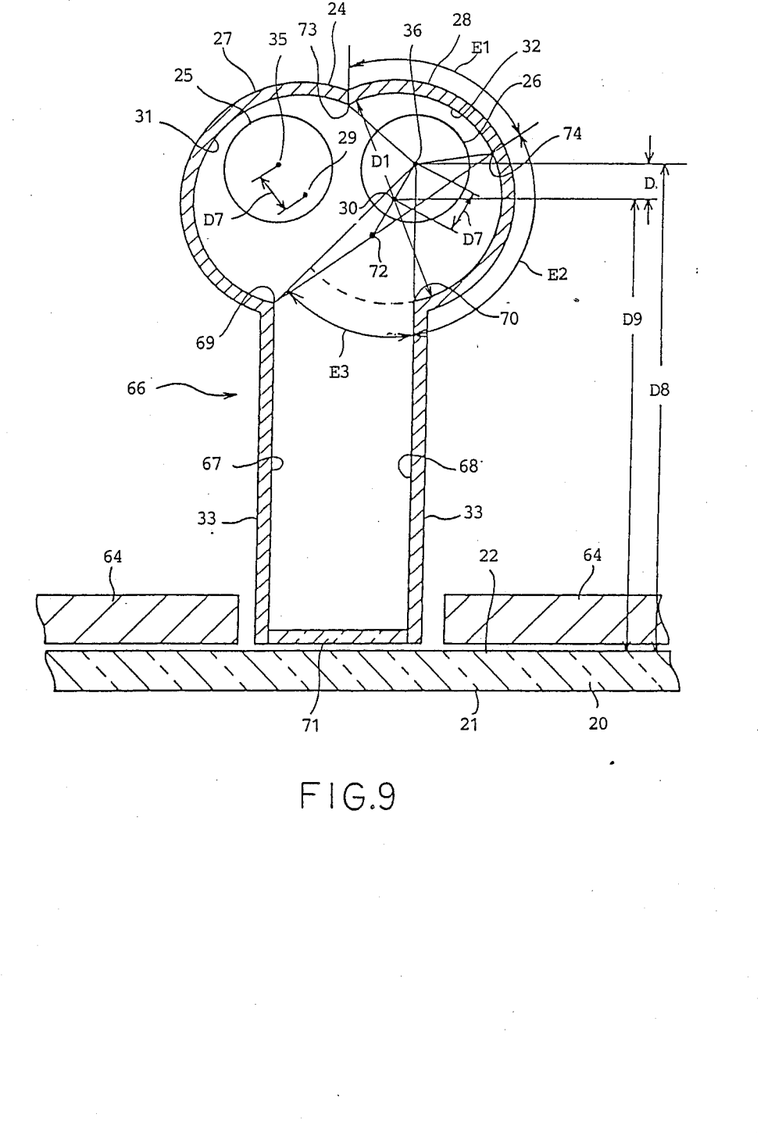
FIG. 9 is a cross sectional view of a part of the solid-state laser device illustrated in FIG. 7.

Referring to FIG. 9, description will be made as regards a light condensing function of the second curved portion 28 of the reflector member 24 of the second reflector device 66. Although description will hereinafter be made only as regards light condensing function of the second curved portion 28, a similar function is achieved in each of the first curved portion 27 of the second reflector device 66 and the first and the second curved portions 27 and 28 of the first reflector device 65 illustrated in FIG. 7.

Inasmuch as the second lamp axis 36 is positioned farther from the second principal surface 22 than the second center axis 30 of the second partially circular cylinder formed by the second arcuate internal surface 32, the second partially circular cylinder looks like a partially elliptic cylinder which has a symmetry axis coincident with the second center axis 30, an outside focal line coincident with the second lamp axis 36, and an inside focal line coincident with an imaginary axis 72. The imaginary axis 72 and the second lamp axis 36 are symmetrical with respect to the second center axis 30. Under such supposition, the second arcuate internal surface 32 reflects excitation light of the second excitation lamp 26 as reflected light towards the imaginary axis 72.

Merely for convenience of description, it will be assumed that the second curved portion 28 is divided into first and second areas E1 and E2 and that the second area E2 is hypothetically contiguous to a third area depicted at E3 in FIG. 9. A reference numeral 73 designates a third boundary between the first and the second arcuate internal surfaces 31 and 32. The second arcuate internal surface 32 and an imaginary plane defined by the first boundary 69 and the imaginary axis 72 intersect at a fourth boundary 74. The first area E1 is defined by the third and the fourth boundaries 73 and 74 while the second area E2 is defined by the fourth and the second boundaries 74 and 70. Supposing that a first plane is defined by the first boundary 69 and the second lamp axis 36 and that a second plane is defined by the second boundary 70 and the second lamp axis 36, the third area E3 is present between the first and the second planes.

The first area E1 reflects excitation light of the second excitation lamp 26 as reflected or indirect light towards the third area E3. The second area E2 reflects excitation light of the second excitation lamp 26 as reflected light towards the first arcuate internal surface 31. Most of the reflected light is again reflected as indirect light towards the third area E3. Such the indirect light is introduced within the extension portion 33 together with direct light applied directly to the third area E3.

With this structure, the second lamp device 66 has a light condensing ability nearly equal to that of an ideal case where each of the first and the second arcuate internal surfaces 31 and 32 forms the partially elliptic cylinder instead of the partially circular cylinder as in the solid-state laser device illustrated in FIG. 5. When a distance D7 between the second center axis 30 and the second lamp axis 36 is not greater than 20 percent of the diameter D1 of each of the first and the second partially circular cylinders, it is possible to achieve a light condensing ability which is not less than 96 percent of that of the ideal case. In order to elevate the light condensing ability, it is preferable that the lamp device 66 has a short interaxial distance D5 (FIG. 7) between the first and the second lamp axes 35 and 36 as far as circumstances permit. Between the first and the fourth boundaries 70 and 74, the second curved portion 28 may have a flat internal surface instead of the second arcuate internal surface 32.

In FIG. 9, a distance between the second lamp axis 36 and the second principal surface 22 is designated by D8 while another distance between the second center axis 30 and the second principal surface 22 is designated by D9. A difference between the distance D8 and the other distance D9 is designated by D.

Figure 10:
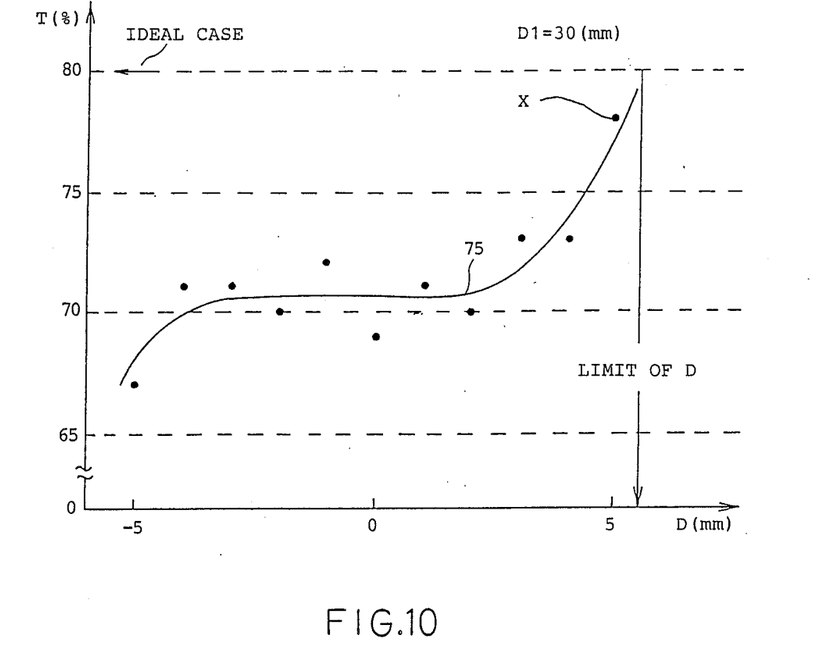
FIG. 10 is a graph for use in describing a merit of the solid-state laser device illustrated in FIG. 7.

Referring to FIG. 10, description will be made as regards a merit of the solid-state laser device illustrated in FIG. 7. A curve 75 shows a characteristic of a ratio T of the quantity of effective light to the quantity of a whole of radiated light radiated by the second excitation lamp 26 when the difference D is varied in the second lamp device 66 illustrated in FIG. 9. The effective light is equivalent in meaning to introduced light which is introduced into the extension portion 33.

The curve 75 is obtained by plotting resultant points given by the use of a computer simulation method known in the art. A resultant point X shows a case of the second lamp device 66 illustrated in FIG. 9. The diameter D1 is equal to 30 millimeters in all cases.

As is apparent from FIG. 10, the second lamp device 66 illustrated in FIG. 9 has a ratio T nearly equal to that of the ideal case. In the ideal case, each of the first and the second arcuate internal surfaces 31 and 32 forms the partially elliptic cylinder as mentioned above.

Figure 11:
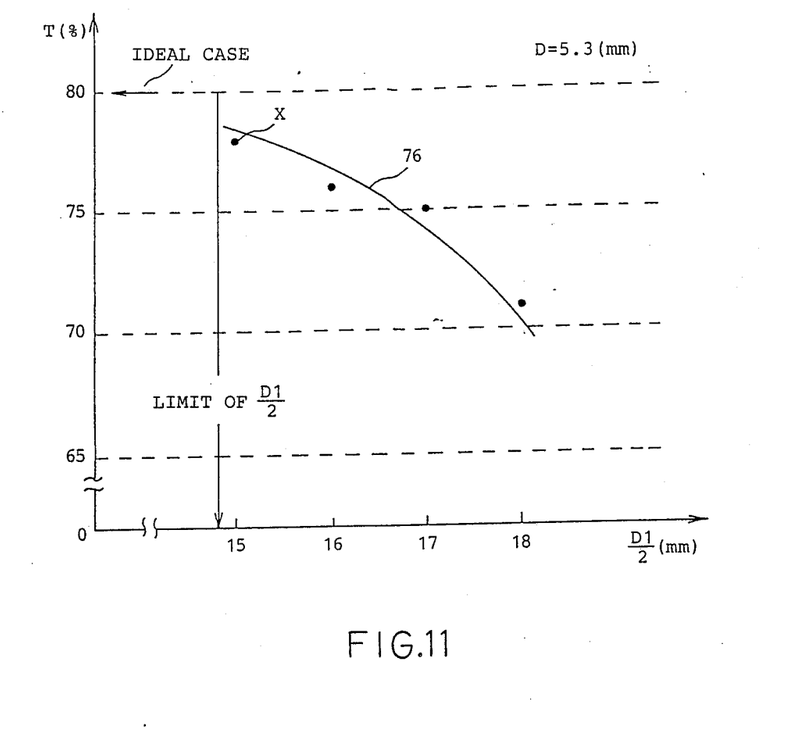
FIG. 11 is a graph for use in describing another merit of the solid-state laser device illustrated in FIG. 7.

Referring to FIG. 11, a curve 76 shows a characteristic of a ratio T of the quantity of the introduced or effective light to the quantity of a whole of radiated light radiated by the second excitation lamp 26 when a radius ($\frac{1}{2}$)×D1 of the second partially circular cylinder is varied in the second lamp device 66 illustrated in FIG. 9.

The curve 76 is also obtained by plotting resultant points given by the use of the computer simulation method. A resultant point X shows a case of the second lamp device 66 illustrated in FIG. 9. The difference D (FIG. 9) is equal to 5.3 millimeters in all cases.

As a result, the solid-state laser device illustrated in FIG. 7 has a high conversion efficiency between electric power and output power with the excitation lamps 25 and 26 disposed far from each principal surface. Actually, it is possible to produce an output laser beam having output power of 300 watts. Maximum output power produced by a conventional moving slab type laser device is about 130 watts.

In the solid-state device illustrated in FIG. 7, each of the first and the second lamp devices 65 and 66 has first and second arcuate internal surfaces 31 and 32 each of which forms a partially circular cylinder. Therefore, each of the first and the second lamp devices 65 and 66 can be manufactured at a low cost.

What is claimed is:

1. In a solid-state laser device comprising a slab shaped medium having an optical axis and a principal surface parallel to said optical axis, a reflector member having an internal wall surface for defining an internal space, an d first and second excitation lamps extended along said optical axis within said internal space, the improvement wherein said reflector member comprises:

first and second curved portions having first and second reflector axes parallel to said optical axis and first and second arcuate internal surfaces, respectively, which are contiguous to each other and which surround said first and said second reflector axes, respectively; and an extension portion extended from said first and said second curved portions towards said principal surface for defining said internal space together with said first and said second curved portions;

said first and said second excitation lamps having first and second lamp axes which are farther from said principal surface than said first and said second reflector axes, respectively, and which are juxtaposed to said first and said second reflector axes and to said optical axis.

2. A solid-state laser device as claimed in claim 1, wherein said first and said second arcuate internal surfaces form first and second partially elliptic cylinders having first and second symmetry axes as said first and said second reflector axes, respectively, said first and said second lamp axes being farther from said principal surface than said first and said second symmetry axes, respectively.

3. A solid-state laser device as claimed in claim 1, wherein said first and said second arcuate internal surfaces form first and second partially circular cylinders having first and second center axes as said first and said second reflector axes, respectively, said first and said second lamp axes being farther from said principal surface than said first and said second center axes, respectively.

4. A solid-state laser device as claimed in claim 1, wherein said extension portion have third and fourth arcuate internal surfaces contiguous to and extended from said first and said second arcuate internal surfaces towards said principal surface, respectively, for defining said internal space together with said first and said second arcuate internal surfaces.

5. A solid-state laser device as claimed in claim 3, wherein said first and said second partially elliptic cylinders have first and second focal lines of focal points, respectively, said first and said second focal lines being parallel to said first and said second symmetry axes, respectively, said first and said second focal lines being farther from said principal surface than said first and said second symmetry axes, respectively, said first and said second lamp axes being substantially coincident with said first and said second focal lines, respectively.

6. A solid-state laser device as claimed in claim 4, wherein said first and said second arcuate internal surfaces form first and second partially elliptic cylinders, respectively, while said third and said fourth arcuate internal surfaces form a third partially elliptic cylinder, said first partially elliptic cylinder having a first symmetry axis as said first reflector axis, a first inside focal line, and a first outside focal line, said second partially elliptic cylinder having a second symmetry axis as said second reflector axis, a second inside focal line, and a second outside focal line, said first and said second outside focal lines being farther from said principal surface than said first and said second inside focal lines, respectively, said third partially elliptic cylinder having a third inside focal line and a third outside focal line, said third inside focal line being nearer to said principal surface than said third outside focal line, said first and said second inside focal lines and said third outside focal line being substantially coincident with one another, said first and said second lamp axes being substantially coincident with said first and said second outside focal lines, respectively.

7. A solid-state laser device as claimed in claim 3, wherein said extension portion comprises a pair of parallel internal wall surfaces which are contiguous to said first and said second arcuate internal surfaces, respectively, and which are extended in parallel to each other from said first and said second arcuate internal surfaces towards said principal surface, respectively.

8. A solid-state laser device as claimed in claim 4, wherein said first and said third arcuate internal surfaces form a first partially elliptic cylinder while said second and said fourth arcuate internal surfaces form a second partially elliptic cylinder, said first partially elliptic cylinder having a first symmetry axis as said first reflector axis, a first inside focal line, and a first outside focal line, said second partially elliptic cylinder having a second symmetry axis as said second reflector axis, a second inside focal line, and a second outside focal line, said first and said second outside focal lines being farther from said principal surface than said first and said second inside focal lines, respectively, said first and said second lamp axes being substantially coincident with said first and said second outside focal lines, respectively.

9. A solid-state laser device as claimed in claim 8, said first partially elliptic cylinder having a first hypothetical plane defined by said first inside and said first outside focal lines, said second partially elliptic cylinder having a second hypothetical plane defined by said second inside and said second outside focal lines, wherein said first and said second hypothetical planes intersect at a hypothetical line which is nearer to said principal surface than both said first and said second symmetry axes.

10. A solid-state laser device as claimed in claim 9, wherein said first and said second hypothetical planes intersects at said hypothetical line which is nearer to said principal surface than both said first and said second symmetry axes and which is farther from said principal surface than both said first and said second inside focal lines.

11. In a lamp device for use in a solid-state laser device comprising a laser medium having an optical axis and a principal surface parallel to said optical axis, said lamp device being for exciting said laser medium, said lamp device comprising a reflector member having an internal wall surface for defining an internal space and first and second excitation lamps extended along said optical axis within said internal space, the improvement wherein said reflector member comprises:
- first and second curved portions having first and second reflector axes parallel to said optical axis and first and second arcuate internal surfaces, respectively, which are contiguous to each other and which surround said first and said second reflector axes, respectively; and
- an extension portion extended from said first and said second curved portions towards said principal surface for defining said internal space together with said first and said second curved portions;
- said first and said second excitation lamps having first and second lamp axes which are farther from said principal surface than said first and said second reflector axes, respectively, and which are juxtaposed to said first and said second reflector axes and to said optical axis.

12. A lamp device as claimed in claim 11, wherein said first and said second arcuate internal surfaces form first and second partially elliptic cylinders having first and second symmetry axes as said first and said second reflector axes, respectively, said first and said second lamp axes being farther from said principal surface than said first and said second symmetry axes, respectively.

13. A lamp device as claimed in claim 11, wherein said first and said second arcuate internal surfaces form first and second partially circular cylinders having first and second center axes as said first and said second reflector axes, respectively, said first and said second lamp axes being farther from said principal surface than said first and said second center axes, respectively.

14. A lamp device as claimed in claim 11, wherein said extension portion have third and fourth arcuate internal surfaces contiguous to and extended from said first and said second arcuate internal surfaces towards said principal surface, respectively, for defining said internal space together with said first and said second arcuate internal surfaces.

15. A lamp device as claimed in claim 12, wherein said first and said second partially elliptic cylinders have first and second focal lines of focal points, respectively, said first and said second focal lines being parallel to said first and said second symmetry axes, respectively, said first and said second focal lines being farther from said principal surface than said first and said second symmetry axes, respectively, said first and said second lamp axes being substantially coincident with said first and said second focal lines, respectively.

16. A lamp device as claimed in claim 13, wherein said extension portion comprises a pair of parallel internal wall surfaces which are contiguous to said first and said second arcuate internal surfaces, respectively, and which are extended in parallel to each other from said first and said second arcuate internal surfaces towards said principal surface, respectively.

17. A lamp device as claimed in claim 14, wherein said first and said third arcuate internal surfaces form a first partially elliptic cylinder while said second and said fourth arcuate internal surfaces form a second partially elliptic cylinder, said first partially elliptic cylinder having a first symmetry axis as said first reflector axis, a first inside focal line, and a first outside focal line, said second partially elliptic cylinder having a second symmetry axis as said second reflector axis, a second inside focal line, and a second outside focal line, said first and said second outside focal lines being farther from said principal surface than said first and said second inside focal lines, respectively, said first and said second lamp axes being substantially coincident with said first and said second outside focal lines, respectively.

18. A lamp device as claimed in claim 14, wherein said first and said second arcuate internal surfaces form first and second partially elliptic cylinders, respectively, while said third and said fourth arcuate internal surfaces form a third partially elliptic cylinder, said first partially elliptic cylinder having a first symmetry axis as said first reflector axis, a first inside focal line, and a first outside focal line, said second partially elliptic cylinder having a second symmetry axis as said second reflector axis, a second inside focal line, and a second outside focal line, said first and said second outside focal lines being farther from said principal surface than said first and said second inside focal lines, respectively, said third partially elliptic cylinder having a third inside focal line and a third outside focal line, said third inside focal line being nearer to said principal surface than said third outside focal line, said first and said second inside focal lines and said third outside focal line being substantially coincident with one another, said first and said second lamp axes being substantially coincident with said first and said second outside focal lines, respectively.

19. A lamp device as claimed in claim 17, said first partially elliptic cylinder having a first hypothetical plane defined by said first inside and said first outside focal lines, said second partially elliptic cylinder having a second hypothetical plane defined by said second inside and said second outside focal lines, wherein said first and said second hypothetical planes intersect at a hypothetical line which is nearer to said principal surface than both said first and said second symmetry axes.

20. A lamp device as claimed in claim 19, wherein said first and said second hypothetical planes intersects at said hypothetical line which is nearer to said principal surface than both said first and said second symmetry axes and which is farther from said principal surface than both said first and said second inside focal lines.

* * * * *